Feb. 23, 1954  W. R. GRACEY, JR  2,670,262
DESK ENCLOSURE FOR AUTOMATIC RECORDERS
Original Filed Jan. 25, 1947  4 Sheets-Sheet 1

INVENTOR.
William R. Gracey Jr.
BY
W. K. Stout
HIS ATTORNEY

INVENTOR.
William R. Gracey Jr.
BY W. L. Stout
HIS ATTORNEY

Feb. 23, 1954     W. R. GRACEY, JR     2,670,262
DESK ENCLOSURE FOR AUTOMATIC RECORDERS
Original Filed Jan. 25, 1947     4 Sheets-Sheet 3

INVENTOR.
William R. Gracey Jr.
BY W. L. Stout
HIS ATTORNEY

Feb. 23, 1954 W. R. GRACEY, JR 2,670,262
DESK ENCLOSURE FOR AUTOMATIC RECORDERS
Original Filed Jan. 25, 1947 4 Sheets-Sheet 4

INVENTOR.
William R. Gracey Jr.
BY W. L. Stout
HIS ATTORNEY

Patented Feb. 23, 1954

2,670,262

UNITED STATES PATENT OFFICE 2,670,262

DESK ENCLOSURE FOR AUTOMATIC RECORDERS

William R. Gracey, Jr., Alexandria, Va., assignor to Westinghouse Air Brake Company, Wilmerding, Pa., a corporation of Pennsylvania Original application January 25, 1947, Serial No. 724,429. Divided and this application November 5, 1952, Serial No. 318,925

2 Claims. (Cl. 346—22)

My invention relates to a desk enclosure for automatic recorders, and particularly to automatic recorders suitable for, although in no way limited to, use in railway signaling systems to record the time at which trains pass designated locations within a controlled territory (OS time), the condition of the signals at a particular location at any specified time, the position of a switch at any specified time, etc.

The present application is a division of my co-pending application, Serial No. 724,429, filed on January 25, 1947, for Paper Advancing Means for Graphic Recorders, now Patent No. 2,631,848, issued March 17, 1953.

One well-known form of an automatic recorder of the type described comprises a roll of time-lined record paper which is advanced at a uniform rate of speed, and upon which a series of lines are traced by means of pens movable to different positions by electrically controlled pen operating means. The time at which any particular recorded function occurs is represented by an offset in the line traced by the pen provided for that particular function.

One object of my invention is to so construct the recorder that substantially all parts of the record paper after it passes the pens may be readily inspected at all times.

Another object of my invention is to provide the recorder with a sliding glass cover which may be moved to different positions without binding to give access to substantially all parts of the paper normally located beneath the cover and to the pens.

A further object of my invention is to provide a recorder of the type described in which the portion of the record paper upon which a record has been made can be readily severed from the stock roll without disturbing the time setting of the paper.

Still further objects of my invention are to cheapen and simplify the construction of a recorder of the type described, while at the same time increasing its utility for its intended purpose.

According to my invention, the recorder comprises a suitable frame consisting of two runners secured in parallel spaced relation to the opposite sides of a bed plate. A roll of time-lined record paper is suspended from the underside of the frame, and the record paper from this roll is carried up over the bed plate and down over a drive roll disposed at the forward end of the bed plate. The drive roll is disposed with its upper edge in horizontal alignment with the upper surface of the bed plate and is driven at a constant speed by any suitable drive means such as a synchronous motor.

The record is made on the record paper by electrically controlled pens mounted on a pen support bar and disposed to engage the record paper above the bed plate. The record paper as it leaves the drive roll moves through a polished chute into a storage bin. The lower portion of the chute is attached to the recorder cover, and when this cover is lowered to the open position, the record paper is accessible for reference and for the removal of accumulated paper. The paper where it moves across the bed plate is covered by two glass covers mounted to slide in velvet covered guides located in recesses milled in the upper inner edges of the runners. The one guide is spring loaded by means of pressure springs to keep the glass cover firmly in position and to enable the glass cover to be moved to give access to the record paper and to the pens without any binding of the cover.

Other objects and characteristic features of my invention will become apparent as the description proceeds.

I shall describe one form of graphic recorder embodying my invention, and shall then point out the novel features thereof in claims.

In the accompanying drawings,

Fig. 6 is a front view of the recorder shown in Figs. 1, 2 and 3, while

Similar reference characters refer to similar parts in each of the several views.

Figure 7:
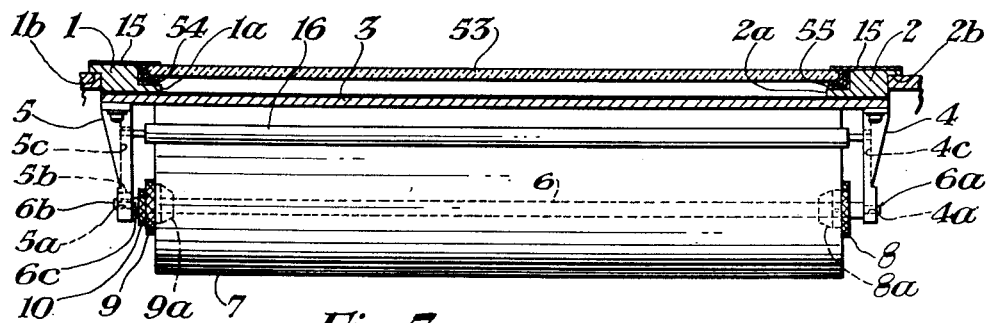
Fig. 7 is a sectional view taken substantially on the line VII—VII of Fig. 2.

Referring to the drawings, the graphic recorder in the form here illustrated comprises a suitable frame consisting of two runners 1 and 2 (see Fig. 7) secured in parallel spaced relation to the opposite sides of a bed plate 3. Attached to the undersides of the runners adjacent the rear end of the bed plate are depending standards 4 and 5 provided in their lower ends with aligned bearing openings 4a and 5a, respectively, which receive trunnions 6a and 6b formed on the opposite ends of a rod 6. The rod 6 supports a roll 7 of time-lined record paper, and in order to permit the trunnions to be readily inserted into place and removed from the bearing openings, the standard 5 is provided with a downwardly inclined slot 5b' which communicates at its lower end with the bearing opening 5a.

The roll 7 of paper is held in the desired longitudinal position on the rod 6 by means of two knurled end plugs 8 and 9. The plug 8 is pinned to the rod adjacent one end of the rod, while the plug 9 is screwed onto a threaded portion 6c provided on the other end of the rod so that this latter end plug can readily be removed from the rod to permit the paper roll to be readily fastened in place on the rod. Each of the plugs 8 and 9 is provided at its inner end with a tapered portion 8a or 9a which is adapted to enter the hole in the center of the paper roll to center the paper roll on the rod, and a lock nut 10 is provided to lock the removable plug 9 in place on the rod 6, after the plug has been screwed into proper engagement with the adjacent end of the paper supply roll. It will be obvious that the paper roll supporting rod can readily be mounted in the standards by first sliding the trunnion 6a lengthwise into the bearing opening 4a, and then lowering the trunnion 6b into the bearing opening 5a through the inclined slot 5b. Removal of the rod 6 from the standards 4 and 5 to permit a new paper supply roll to be mounted on the rod can be effected by reversing the procedure just described.

The paper from the paper supply roll is carried upwardly over an idler roll 13 (Fig. 2), lengthwise of the bed plate 3, and then downwardly between two rolls 11 and 12 (Fig. 3) which constitute a part of a driving mechanism for advancing the record paper over the bed plate at a uniform rate of speed. The idler roll 13 is journaled at its ends in bearing brackets 14 secured to the undersides of the runners 1 and 2, and is so disposed that the uppermost portion of its surface lies in the same horizontal plane as the upper surface of the bed plate and its longitudinal axis extends parallel to the transverse axis of the bed plate.

A uniform tension is maintained on the paper leaving the paper supply roll 7 irrespective of the size of the roll by means of a drag rod 16 which is journaled at its end in vertical slots 4c and 5c provided in the standards 4 and 5, and which is biased by gravity into engagement with the top of the paper roll at the point where the paper leaves the roll.

The drive roll 11 is supported on a central shaft 20 (Fig. 3) journaled in suitable anti-friction bearings 21 mounted in bearing openings provided in two end plates 17 and 18. The end plates 17 and 18 are fastened together in parallel spaced relation by means of three spacing rods 19, and the framework thus formed is bolted as a unit to the underside of the runners 1 and 2 by means of suitable machine screws which pass downwardly through clearance holes in the runners and are screwed into tapped holes formed in flanges provided on the upper ends of the end plates.

One end of the shaft 20 extends through the end plate 18, and is provided at its outer end with a worm wheel 22 which meshes with a worm gear 23 (Figs. 1 and 2) pinned to a drive shaft 24. The drive shaft 24 is journaled at one end in a bearing lug 25 provided on the end plate 18, and at the other end in a bearing lug 26 formed on a removable bearing bracket 27 secured to the end plate 18. The drive shaft 24 is driven through a gearing arrangement more fully described in the aforesaid parent application by a synchronous motor 28 secured to supporting lugs 29 cast integrally with the end plate 18.

The pressure roll 12 is journaled at its ends in ball bearings mounted in two pressure arms 30 and 31 which are secured together in laterally spaced relation by a pressure roll release bar 32, and which together with the release bar comprise a supporting frame for the pressure roll. The arms 30 and 31 are pivotally mounted on the end plates 17 and 18, as more fully described in my aforesaid parent application. The frame formed by the two arms 30 and 31 and the associated release bar is biased upwardly to the position in which the pressure roll engages the record paper by means of two biasing springs 32 and 33. These springs are hooked at their upper ends over supporting pins 34 attached to the end plates 17 and 18, and at their lower ends through eyes formed on adjusting bolts 35 extending through the arms 30 and 31.

Figure 1:
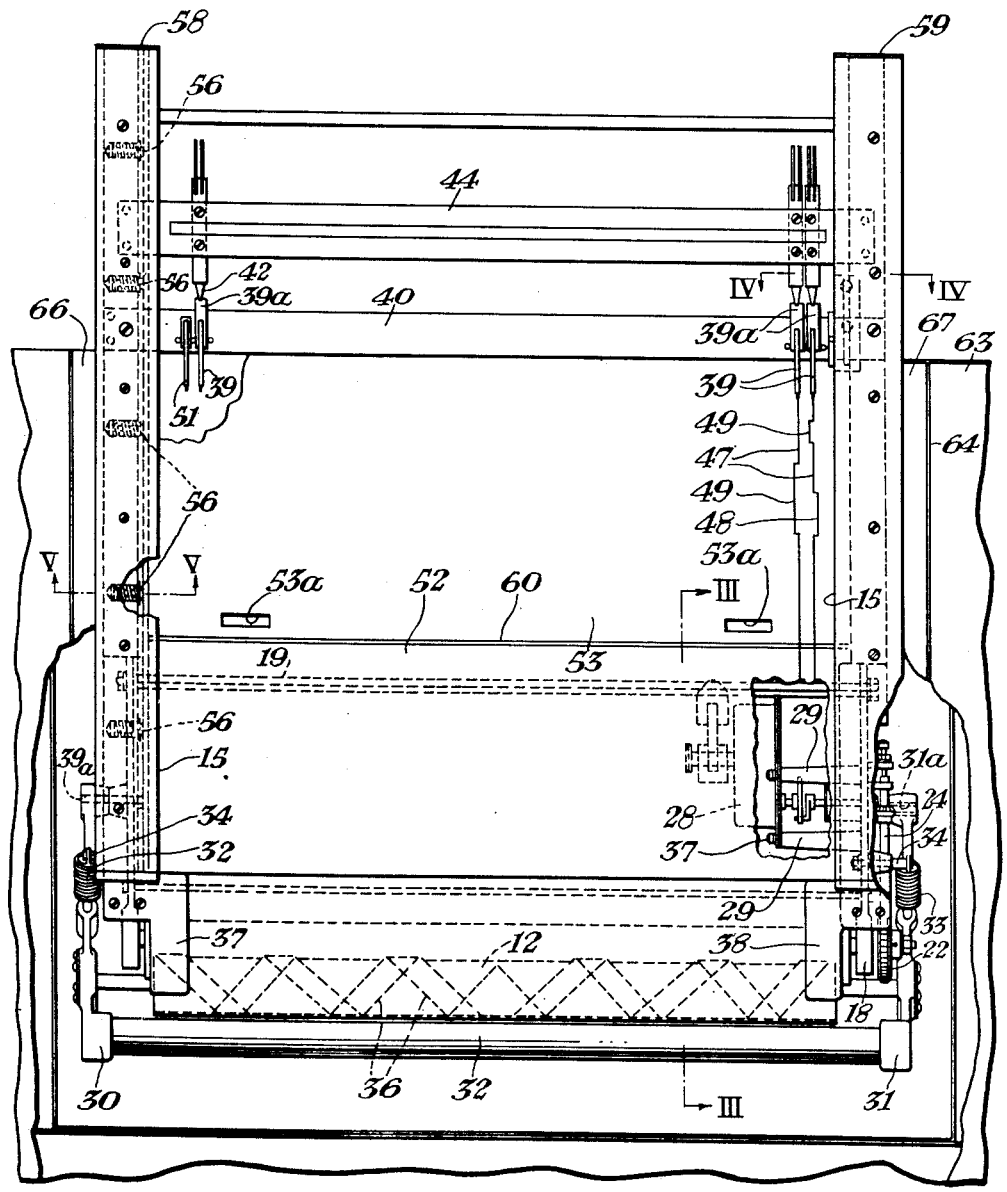
Fig. 1 is a top plan view of a graphic recorder embodying my invention with certain of the parts broken away to more clearly illustrate the construction of the remaining parts.

To provide the proper friction between the friction and drive rolls and the paper passing between these rolls and at the same time prevent wrinkling of the paper, the pressure roll 12 is provided with strips 36 (Figs. 1 and 3) of suitable yieldable material, such as felt having a sufficiently low adhesion to the paper to prevent wrinkling of the paper. As shown in Fig. 1, the strips 36 are wound spirally around the pressure roll in opposite directions from the center of the roll toward its ends.

Figure 2:
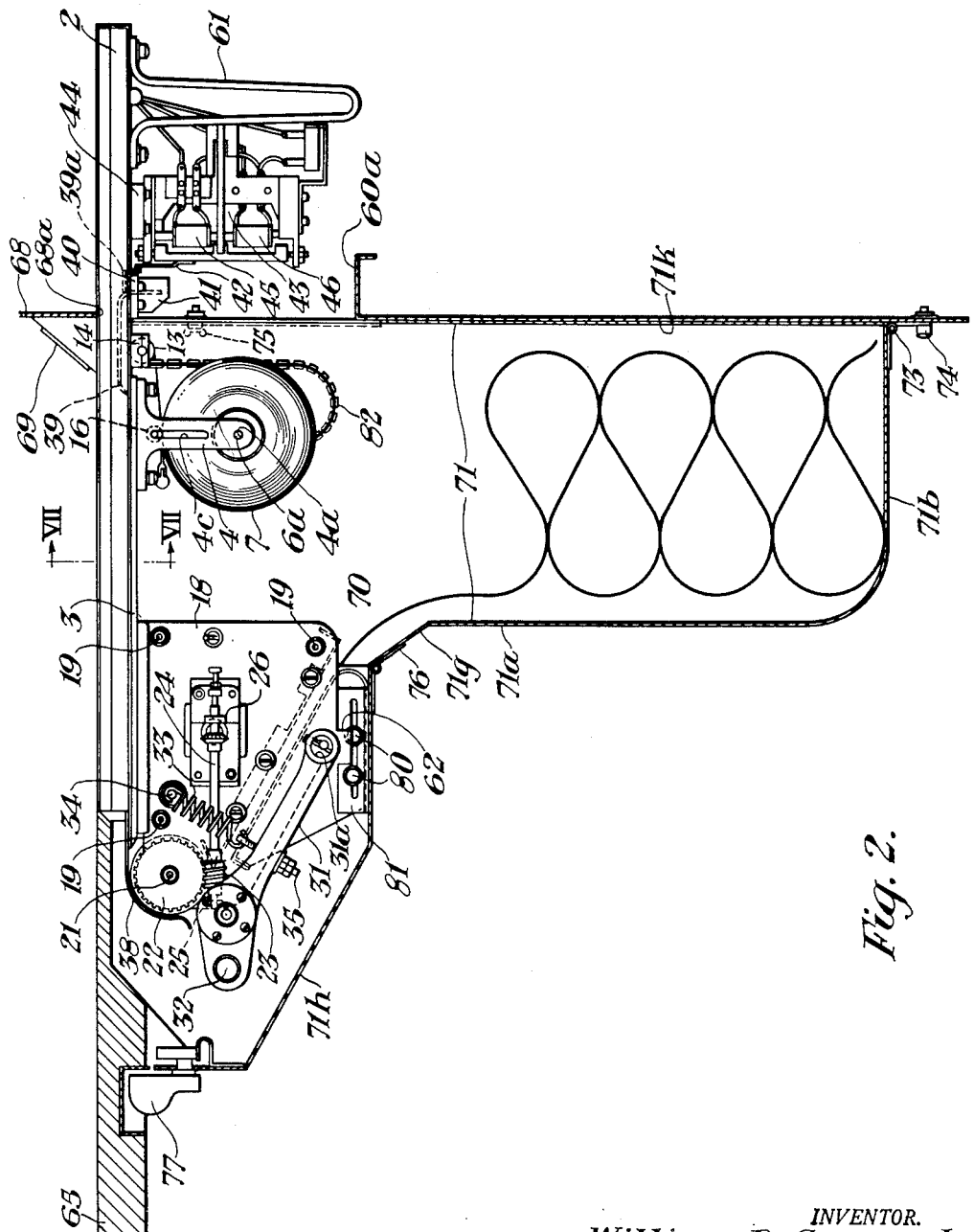
Fig. 2 is a right-hand end view of the recorder in place in the desk of the control cabinet for a centralized traffic control system for railroads, some of the parts being shown in section for the sake of clearness.
Figure 3:
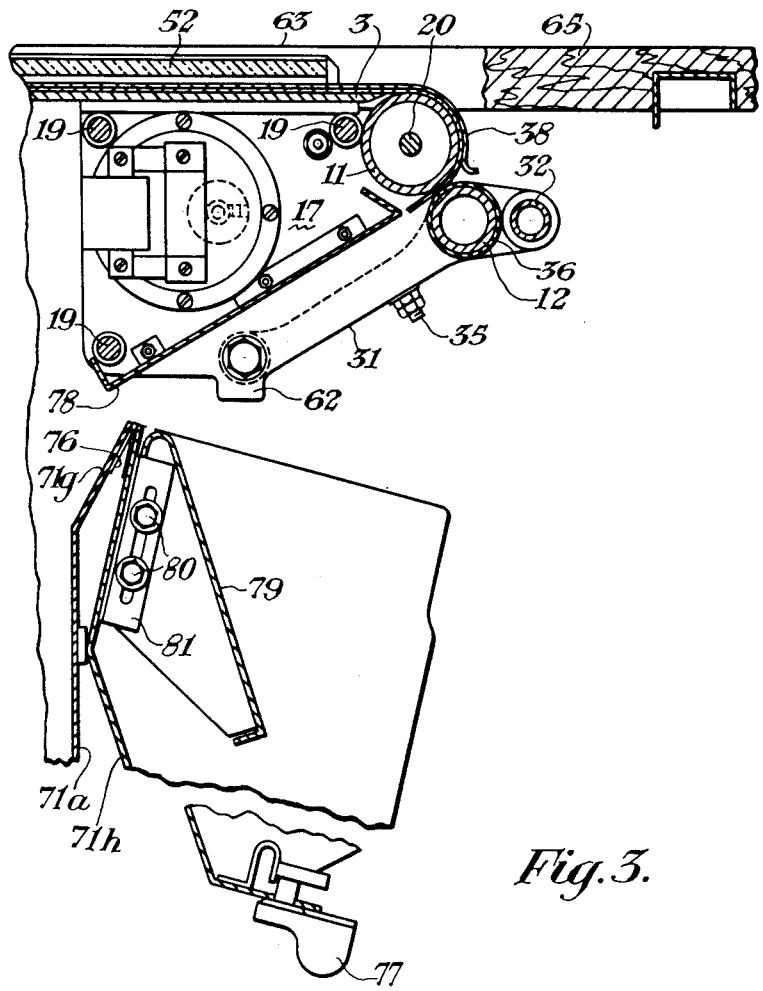
Fig. 3 is a sectional view of the recorder taken substantially on the line III—III of Fig. 1.

Secured to the runners 1 and 2 at their forward ends are two paper guides 37 and 38 which curve downwardly around the drive roll as best seen in Figs. 2 and 3, and which serve to cause the paper to follow the curvature of the drive roll when the paper is first being inserted into place in the recorder.

Figure 6:
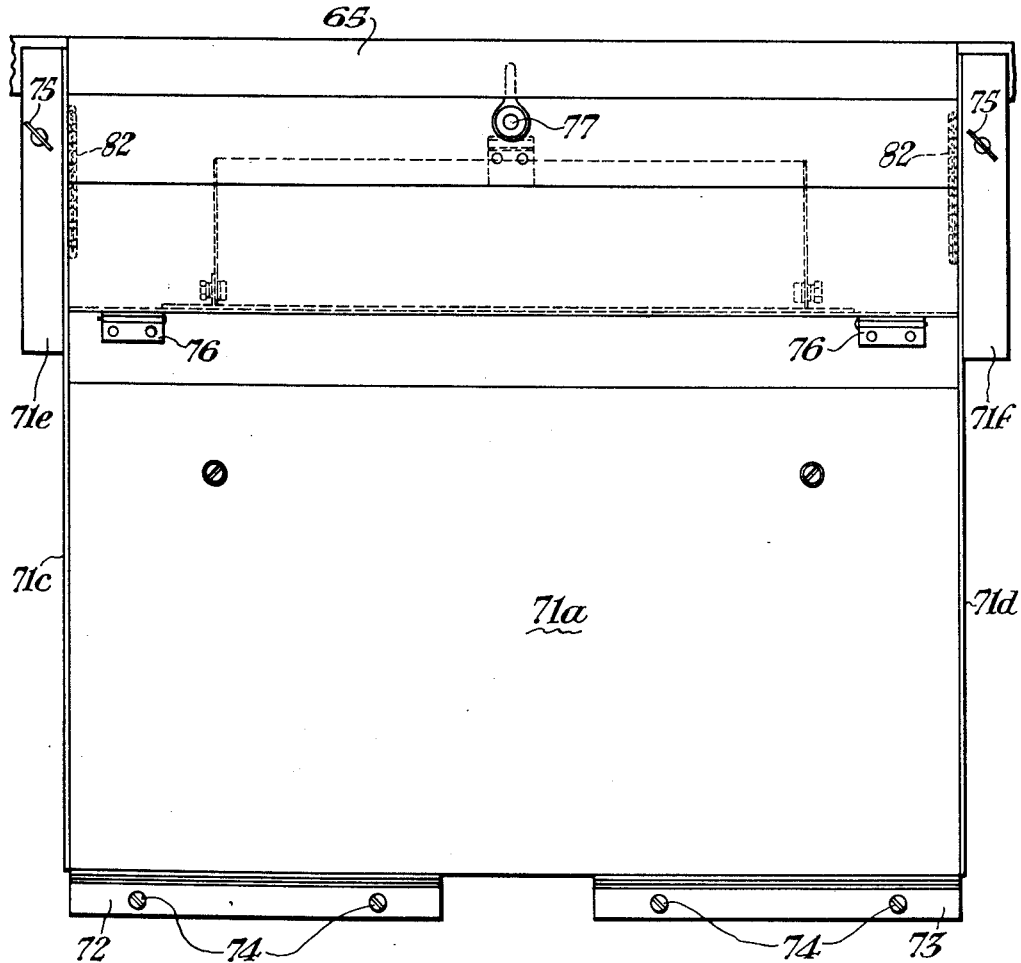

The desired record is provided on the record paper of the recorder by means of a plurality of pens 39 which are pivotally supported on a pen support bar 40 secured at its ends to the undersides of the runners 1 and 2. An inkwell 41 extends throughout the full length of the pen support bar 40 underneath the bar, and one end of each pen extends into the ink provided in the inkwell (see Fig. 6), while the other end of each pen is so disposed that it will trace a line on the record paper as the paper is moved underneath the pen by the drive mechanism. Each pen is provided with a rearwardly extending forked arm 39a which cooperates with the arm 42 of an associated operating electromagnet 43 (see Figs. 1 and 2) to operatively connect the pen with the magnet. The magnets are supported on a magnet support bar 44 secured at its ends to the undersides of the runners 1 and 2. The magnets may be of any suitable type but, as here shown, they are each three-position magnets employing two neutral windings 45 and 46, and are each similar to the magnet which is described in detail in Letters Patent of the United States No. 2,425,843, issued August 19, 1947, to C. S. Snavely, for Electromagnet and Control Means Therefor. It is sufficient to point out that when both of the windings 45 and 46 of the electromagnet 43 are deenergized, the pen will occupy a normal central position shown in Fig. 1 and will trace a line along the path 47 on the record paper. When, however, the upper winding 45 is energized, the pen will then be rotated in a counterclockwise direction as viewed in Fig. 1, through a limited distance from its normal position and will trace a line along the path 48, whereas when the winding 46 is energized, the associated pen will be moved in the opposite direction and will trace a path along the line 49.

Figure 4:
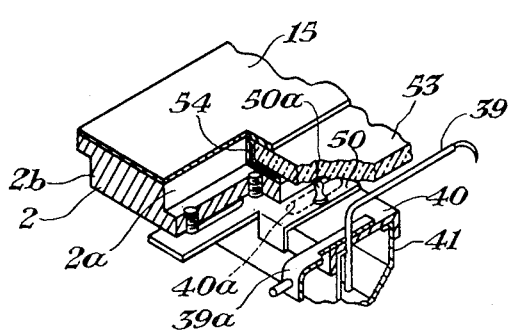
Figs. 4 and 5 are detail views taken substantially on the line IV—IV and V—V, respectively, of Fig. 1.

To facilitate filling the inkwell, an opening 40a (see Fig. 4) is provided in the bar 40 adjacent to the runner 2. This opening is normally closed by an inkwell cover 50 slidably supported between the underside of the runner 2 and the top of the support bar 40 for movement between a closed position in which it is shown in Fig. 4 and an open position in which the opening 40a in the bar 40 is exposed. To facilitate moving the cover, an upwardly projecting pin 50a is provided.

Disposed at the left-hand end of the pen support bar 40 as viewed in Fig. 1 is a pilot pen 51 so constructed that when the supply of ink in the inkwell has become reduced to the point where it should be replenished to maintain the pens in operation, this pilot pen will stop tracing a line on the record paper.

Figure 5:
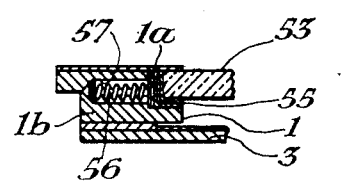

To protect the record paper and the pens from damage due to dirt and the like or from objects coming into contact with the paper or the pens and to permit the record traced on the paper by the pens to be observed at all times, two plate glass covers 52 and 53 are provided. These covers cooperate with velvet covered L-shaped slides 54 and 55 disposed in recesses 2a and 1a milled in the upper inner edge of the runners 1 and 2, and are prevented from vertical displacement by metal strips 15 secured to the upper sides of the runners. The glass covers are rectangular in shape and are of such lengths that when the velvet covered slides are spaced as far apart as the recesses 2a and 1a will permit, some clearance will exist between the covers and the slides. The slide 55 is constantly biased inwardly to the position in which its inner vertical edge engages both edges of the covers by means of a plurality of spring pressed biasing members 56 mounted in longitudinally spaced laterally extending holes 57 (see Fig. 5) drilled in the inner edges of the runners directly opposite the slides. The slides are held in fixed positions lengthwise of the runners by means of end plates 58 and 59 secured to the ends of the runners 1 and 2, respectively. The rear cover glass is somewhat wider than the front cover glass, and has two recesses 53a ground in its upper surface to facilitate gripping this cover to enable it to be readily moved to the different longitudinal positions with respect to the runners. To prevent breakage of the covers resulting from bumping the covers together at their adjoining edges, a strip 60 of plastic material is cemented or otherwise fastened to the lower edge of the glass cover 53 as viewed in Fig. 1. The lengths of the covers and slides are such that by moving the covers to different positions access to all parts of the record paper and to the pens can readily be had. It should be particularly pointed out that the spring bias exerted on the slide 55 by the biasing units enables both covers to be moved without binding by a force applied to any part of the top of the covers.

Attached to the runners adjacent their rear ends are supporting legs 61 which together with depending lugs 62 (see Figs. 2 and 3) formed on the end plates 17 and 18 provide a means for supporting the recorder as a whole on the top of a desk or any article suitable for this purpose.

A graphic recorder of the type described is particularly suitable for, although in no way limited to, use in connection with a centralized traffic control system for railroads, and when so used the recorder is intended to be mounted in the top of a desk incorporated in the control cabinet for the centralized traffic control system in such manner that the top surface of the recorder will be flush with and form a part of the desk top. One convenient means for mounting the recorder in the desk will now be described.

As illustrated, the desk top which is designated as a whole by the reference character 63 (see Fig. 1) is provided with a central rectangular opening 64 disposed behind a movable front portion 65 (Figs. 2 and 3) which can be swung upwardly for a purpose which will appear presently. The opening 64 is substantially the same width as the recorder, and secured to the desk top at opposite sides of the opening are two L-shaped recorder supports 66 and 67 (see Fig. 1). The recorder runners 1 and 2 are provided in their outer edges with milled slots 1b and 2b, and the recorder supports are spaced apart such a distance that the runners 1 and 2 will engage the supports 66 and 67 at the tops of the slots 1b and 2b. The runners 1 and 2 are considerably longer than the supports 66 and 67 and project rearwardly beyond the front panel 68 of the cabinet through an opening 68a (see Fig. 2) provided in the front panel. It will be seen, therefore, that the graph can readily be inserted into place in the desk top from the rear of the cabinet by first resting the front ends of the runners on the rear ends of the recorder supports 66 and 67 and then sliding the recorder forwardly on the runners until the front ends of the runners engage the rear edge of the movable front portion 65 of the desk top in its lowered position. It will be noted that when the recorder is in place in the desk top, as shown in Fig. 2, that portion of the recorder in rear of the tips of the pens is disposed behind the front panel 68 of the cabinet so that only the tips of the pens are visible through the glass top of the recorder. To indicate the function of each pen, a small track model 69 may be provided directly above the pens, as shown in Fig. 2.

With the recorder in place in the cabinet, the record paper of the recorder as it leaves the pressure roll moves through a separable polished chute 70 into a storage bin 71.

The storage bin, as shown, is of sheet metal construction, and comprises a front wall 71a, a bottom wall 71b, end walls 71c and 71d and a back wall 68b. The bottom wall 71b is secured at its rear end to two spaced hinges 72 and 73, which latter, in turn, are secured to the vertical front wall 68 of the cabinet below the bin by means of separable fasteners 74. The separable fasteners 74 are of well-known construction and for purposes of my present invention, it is sufficient to point out that they are so constructed that when rotated to one position the shank portions of the fasteners can be inserted through or removed from clearance holes in the front wall of the cabinet, and that after they are inserted through the holes in the cabinet, if they are then rotated through an angle of 90° by inserting a screw driver into the saw kerf provided in the head of the fastener, a pin which extends through the shank portion of the fastener will cooperate with inclined surfaces provided on the female portion of the fastener in a manner to securely fasten the hinges in place on the front of the panel 68. The two end walls 71c and 71d of the bin are provided at their upper ends with outwardly projecting portions 71e and 71f which are secured to the front panel 68 of the cabinet by means of wing fasteners 75. The wing fasteners 75 except for the heads are similar to the fasteners 74 previously described.

The front wall 71a of the bin is somewhat shorter than the end walls 71c and 71d, and is provided at its upper end with an outwardly inclined portion 71g to which a recorder cover 71h is pivotally attached by means of laterally spaced hinges 76. The cover 71h extends outwardly and upwardly from the front wall 71a of the bin for a sufficient distance to completely enclose the forward end of the recorder, and is provided at its outer end with a thumb latch 77 by means of which the cover can be secured in a closed position, as shown in Fig. 2. The cover, however, is adapted to be at times dropped to a lower or open position in which it is shown in Fig. 3 to provide access to the record paper as it leaves the pressure and drive rolls to permit ready inspection of the paper at any time and also to permit severance of the portion of the paper which has moved into the bin.

The chute 78 comprises a chute top plate 78, see Fig. 3, bolted or otherwise fastened at its ends to the end plates 17 and 18 of the frame which supports the drive mechanism of the recorder and a chute bottom plate 79 secured at its ends by means of adjusting bolts 80 to slotted angle brackets 81 spot welded or otherwise secured to the recorder cover. It will be obvious that by loosening the adjusting bolts 80, the chute bottom plate can be slid backwardly or forwardly to positions in which it is spaced a greater or lesser distance from the chute top plate. The bottom plate is preferably so adjusted that when the cover member is latched in its closed position, the chute bottom plate will be spaced approximately one-quarter inch from the chute top plate.

It is at times desirable to be able to swing the bin 71 and associated cover member 71h forwardly away from the front panel of the cabinet to permit ready cleaning of the bin, and it will be obvious that this can be done by first lowering the cover member to the position shown in Fig. 3 and then removing the wing fasteners 75. The distance that the bin can be swung forwardly is limited by two chains 82, one end of each of which is secured to the underside of the associated recorder support, and the other end of each of which is secured to the inner side of an associated one of the end walls of the bin.

One advantage of a recorder constructed and mounted in the desk of a centralized traffic control machine in the manner described is that access to all parts of the record provided on the record paper except a very small portion which is passing between the drive and pressure rolls may readily be had at all times.

Another advantage of a recorder constructed and mounted in the manner described is that it is not necessary to disturb the timing of the recorder or its operation while removing that portion of the record from the recorder which has already been completed.

Another advantage of a recorder constructed in accordance with my invention is that since the record paper is advanced by means of the wringer action previously described, the timing is unaffected by variations in the thickness of the paper, and setting of the paper to any desired time can very readily be accomplished in either one of two ways. The one way consists in lowering the recorder cover and pulling the paper to the position in which the correct time-line is under the tips of the pen by grasping the paper at both edges of recorded paper in the chute section. An alternate method of adjusting the paper consists in raising the movable portion of the desk top, and with one hand depressing the pressure roll release bar to hold the rolls separated. The paper can then be slid forwardly or backwardly with a slight pressure of the palm of the hand on any portion of the paper. The paper can thus be moved slowly until the desired time-line is under the tip of the pens.

Although I have herein shown and described only one form of graphic recorder embodying my invention, it is to be understood that various changes and modifications may be made therein within the scope of the appended claims without departing from the spirit and scope of my invention.

Having thus described my invention, what I claim is:

1. In combination, a wall, a desk disposed in front of said wall, the top of said desk being provided with a movable front portion and with an opening disposed between said movable portion and said wall, recorder supports secured to said desk top at opposite sides of said opening, a graphic recorder slidably supported on said supports in a manner to be visible through said opening and provided with a roll of record paper which is advanced at a uniform rate of speed by a drive mechanism disposed at the forward end of the recorder, a bin pivotally attached at its lower end to said wall and secured at its upper end to said wall by separable fasteners, said bin serving to enclose the underside of said recorder and being provided at its forward end with a hinged cover portion and with means for latching said cover portion in a closed position, and a chute for guiding the paper as it leaves the recorder into said bin, said chute comprising a chute top plate secured to the underside of said recorder and a chute bottom plate secured to said cover portion.

2. In combination, a wall, a desk disposed in front of said wall, the top of said desk being provided with a movable front portion and with an opening disposed between said movable portion and said wall, recorder supports secured to said desk top at opposite sides of said opening, a graphic recorder slidably supported on said supports in a manner to be visible through said opening and provided with a roll of record paper which is advanced at a uniform rate of speed by a drive mechanism disposed at the forward end of the recorder, a bin pivotally attached at its lower end to said wall and secured at its upper end to said wall by separable fasteners, said bin serving to enclose the underside of said recorder and being provided at its forward end with a hinged cover portion and with means for latching said cover portion in a closed position, and a chute for guiding the paper into said bin as it leaves the recorder, said chute comprising a chute top plate secured to the underside of said recorder and a chute bottom plate secured to said cover portion, said chute bottom plate being longitudinally adjustable to enable the spacing between it and said chute top plate when said cover portion is closed to be readily varied.

WILLIAM R. GRACEY, JR.

References Cited in the file of this patent

UNITED STATES PATENTS

| Number | Name | Date |
|---|---|---|
| 2,486,764 | Singer | Nov. 1, 1949 |
| 2,524,564 | Gorham | Oct. 3, 1950 |
| 2,566,064 | Keim | Aug. 28, 1951 |
| 2,618,528 | Caldwell | Nov. 18, 1952 |